(No Model.)
E. ATKINSON.
COOKING APPARATUS.
No. 417,698.          Patented Dec. 24, 1889.
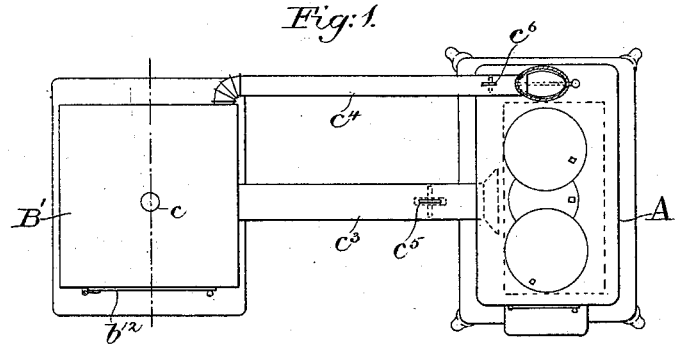
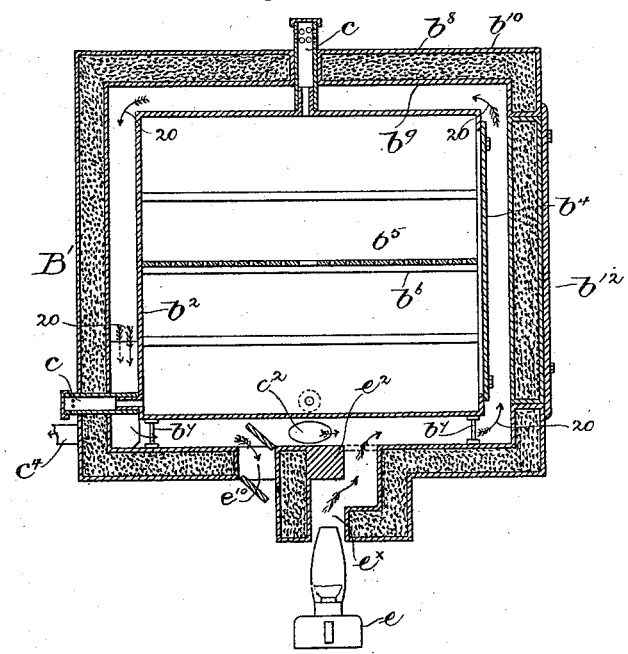
Witnesses:
Howard F. Eaton.
Frederick L. Emery.
Inventor:
Edward Atkinson
By Crosby & Gregory
Attys.

UNITED STATES PATENT OFFICE.

EDWARD ATKINSON, OF BROOKLINE, MASSACHUSETTS.

COOKING APPARATUS.

SPECIFICATION forming part of Letters Patent No. 417,698, dated December 24, 1889.

Application filed May 22, 1888. Serial No. 274,640. (No model.)

*To all whom it may concern:*

Be it known that I, EDWARD ATKINSON, of Brookline, county of Norfolk, State of Massachusetts, have invented an Improvement in Cooking Apparatus, of which the following description, in connection with the accompanying drawings, is a specification, like letters on the drawings representing like parts.

This invention has for its object to provide a novel cooking apparatus, especially adapted to be used in connection with a stove or range of ordinary construction, whereby a portion of the heat from the fire-box or combustion-chamber of the said stove may be utilized to heat the oven and the food therein cooked at a minimum expense.

My improved cooking apparatus or oven will be connected to the stove by suitable pipes provided with suitable dampers by which the said oven may be cut off from the stove, when so desired, and each employed independently of the other.

My invention therefore consists in the combination, with a heater or stove provided with a fire-box or combustion-chamber and a stove-pipe connected with the chimney, of the oven B', composed of an outer oven provided with an inlet-opening $c^2$, connected by a pipe $c^3$ with the said combustion-chamber, an outlet-pipe $c^4$, connected to the stove-pipe, and inlet and outlet openings $e^x$ $e^{10}$ in the bottom of the said outer oven, and an inner oven supported within the outer oven to leave an air-space between them, the pipes $c^3$ $c^4$ being provided with dampers, whereby communication between the combustion-chamber of the stove and the outer oven may be controlled as desired, and the said oven used in conjunction with or independent of the stove, substantially as will be described.

Figure 1 is a top or plan view of a stove or heater and my improved oven connected thereto, the pipe of the stove being shown in section; and Fig. 2, a vertical longitudinal section of the oven, showing an auxiliary heater or lamp below it.

The stove or heater A, which may be of any usual or well-known construction—such, for instance, as an ordinary kitchen stove or range—has connected to it the oven B', constituting my improved cooking apparatus.

The oven B' is composed, as herein shown, of an inner metallic oven $b^3$, provided with a door $b^4$, and having suitable shelves $b^5$, only one of which is shown, the said shelves being supported, as shown, on ribs or projections $b^6$ in the sides of the said inner oven. The inner oven $b^3$ is supported upon suitable legs $b^7$, which rest upon the bottom of an outer casing or oven composed of two walls $b^8$ $b^9$ with an intervening layer $b^{10}$ of any usual non-heat-conducting material—such as asbestus, &c.—interposed between them, the said outer casing or oven having a suitable door $b^{12}$, by which access may be had to the inner oven. The inner oven $b^3$ is provided, as shown, with suitable vent-pipes $c$ $c'$, extending, respectively, through the top and one side of the outer casing or oven, the said pipes establishing a circulation of air through the said inner oven, whereby obnoxious odors, which might taint the food being cooked, may be carried off.

One side of the outer casing or oven, near the bottom thereof and below the inner oven, is provided with an opening $c^2$, which communicates with the fire-box or combustion-chamber of the stove or range A, as herein shown, by a pipe $c^3$, the said pipe being provided, as shown, with a bell-shaped mouth or inlet. (See dotted lines, Fig. 1.)

Some of the products of combustion from the stove on their way to the chimney pass through the pipe or flue $c^3$ into the outer casing or oven and circulate around the inner oven, as indicated by arrows 20 in Fig. 2, the said products of combustion passing from the outer casing through the pipe or outlet $c^4$, connected, as shown, with the stove-pipe leading to the chimney.

The inlet and outlet pipes $c^3$ $c^4$ of the oven are provided, respectively, with any usual dampers $c^5$ $c^6$, by which the said oven may be connected with and disconnected from the fire-box and stove-pipe or the chimney of the house.

In operation the stove or range A may be used in the ordinary manner, and, if desired, a portion of the food to be prepared—such, for instance, as roasts, pies, and puddings—especially when a large quantity of food is to be cooked, may be placed in the inner oven of the oven B', and the dampers $c^5$ $c^6$ be opened, the said food being cooked by the heat of the products of combustion conducted into the outer casing or oven by the pipe $c^3$, and, circulating around the inner oven, then passing from the outer oven by the pipe $c^4$.

When it is inexpedient to light a fire in the stove or heater—as, for instance, in the summer time—the heat required to cook the meat or other articles in the oven B' may be furnished by one or more lamps or burners placed beneath an opening $e^x$ in the outer casing or oven, the heat impinging directly upon a solid block or piece $e^2$ of iron, soapstone, &c.

The products of combustion from the lamp circulate around the inner oven and escape through the outlet $e^{10}$.

I claim—

The combination, with a heater or stove provided with a fire-box or combustion-chamber, and a stove-pipe connected with the chimney, of the oven B', composed of an outer oven provided with an inlet-opening $c^2$, connected by a pipe $c^3$ with the said combustion-chamber, an outlet-pipe $c^4$, connected to the stove-pipe, and inlet and outlet openings $e^x$ $e^{10}$ in the bottom of the said outer oven, and an inner oven supported within the outer oven to leave an air-space between them, the pipes $c^3$ $c^4$ being provided with dampers whereby communication between the combustion-chamber of the stove and the outer oven may be controlled as desired, and the said oven used in conjunction with or independent of the stove, substantially as described.

In testimony whereof I have signed my name to this specification in the presence of two subscribing witnesses.

EDWARD ATKINSON.

Witnesses:
GEO. W. GREGORY,
J. H. CHURCHILL.